United States Patent
Venkatesh et al.

(10) Patent No.: US 8,396,063 B1
(45) Date of Patent: Mar. 12, 2013

(54) MULTI-THREAD MEDIA ACCESS CONTROLLER WITH PER-THREAD MAC ADDRESS

(75) Inventors: Narasimhan Venkatesh, Hyderabad (IN); Satya Rao, Hyderabad (IN); Heonchul Park, Cupertino, CA (US)

(73) Assignee: Redpine Signals, Inc., San Jose, CA (US)

( * ) Notice: Subject to any disclaimer, the term of this patent is extended or adjusted under 35 U.S.C. 154(b) by 376 days.

(21) Appl. No.: 11/982,614

(22) Filed: Nov. 5, 2007

Related U.S. Application Data

(63) Continuation of application No. 10/448,639, filed on May 30, 2003, now Pat. No. 7,327,700.

(51) Int. Cl.
*H04L 12/56* (2006.01)

(52) U.S. Cl. ........................................ 370/392; 370/535

(58) Field of Classification Search .................. 370/267, 370/314, 326, 537
See application file for complete search history.

(56) References Cited

U.S. PATENT DOCUMENTS

| | | | |
|---|---|---|---|
| 6,026,088 A | 2/2000 | Rostoker et al. | |
| 6,028,837 A * | 2/2000 | Miller | 370/222 |
| 6,052,365 A | 4/2000 | Bhagalia et al. | |
| 6,061,362 A * | 5/2000 | Muller et al. | 370/463 |
| 6,067,300 A * | 5/2000 | Baumert et al. | 370/413 |
| 6,094,439 A | 7/2000 | Krishna et al. | |
| 6,516,952 B1 * | 2/2003 | Wang et al. | 209/227 |
| 6,683,866 B1 | 1/2004 | Stanwood et al. | |
| 6,738,641 B1 | 5/2004 | Elsasser | |
| 2001/0034872 A1 * | 10/2001 | Smallcomb | 714/786 |
| 2002/0021685 A1 * | 2/2002 | Sakusabe | 370/338 |
| 2004/0008740 A1 * | 1/2004 | Baker | 370/537 |
| 2005/0213727 A1 * | 9/2005 | Nir et al. | 379/202.01 |
| 2006/0291386 A1 * | 12/2006 | Jyske et al. | 370/230 |

OTHER PUBLICATIONS

Intersil Datasheet ISL 3873 B, Intersil Corp, Milpitas CA (Application Note FN 8019.2), Jun. 24, 2002.

* cited by examiner

*Primary Examiner* — Jianye Wu
*Assistant Examiner* — Wanda Z Russell
(74) *Attorney, Agent, or Firm* — File-EE-Patents.com; Jay A. Chesavage

(57) ABSTRACT

A wireless signal processor for handling a plurality of wireless sessions comprises a plurality of baseband receivers, one for each session, each receiver producing a digital output, a multiplexer for multiplexing the plurality of digital outputs into a single data stream, a digital signal processor for converting the stream of multiplexed data into a media access controller format, and a media access controller for demultiplexing and framing the stream of data into a plurality of data buffers, one data buffer for each wireless session.

20 Claims, 9 Drawing Sheets

Figure 1: Prior Art
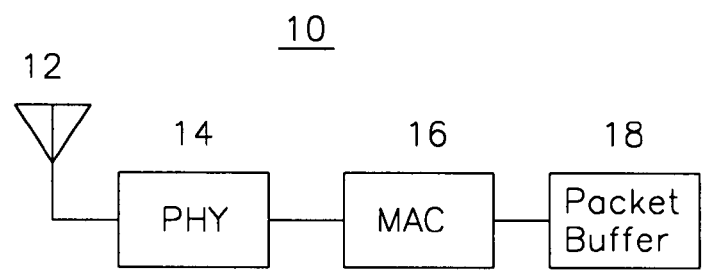
Figure 2: Prior Art
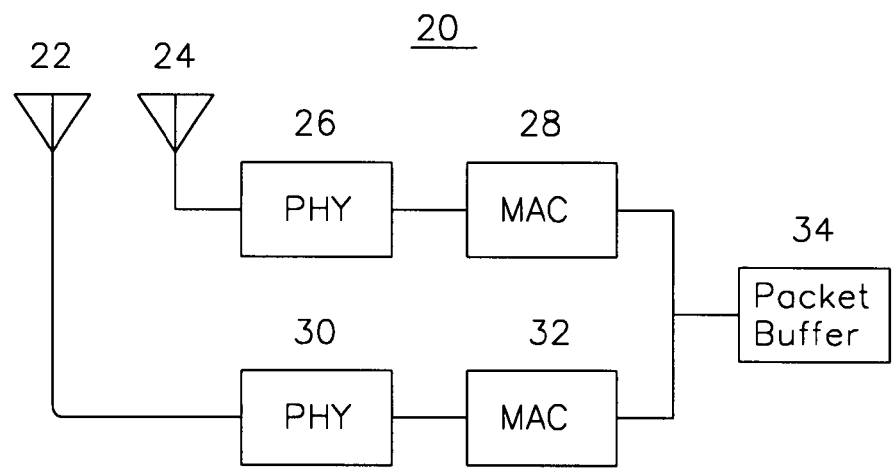

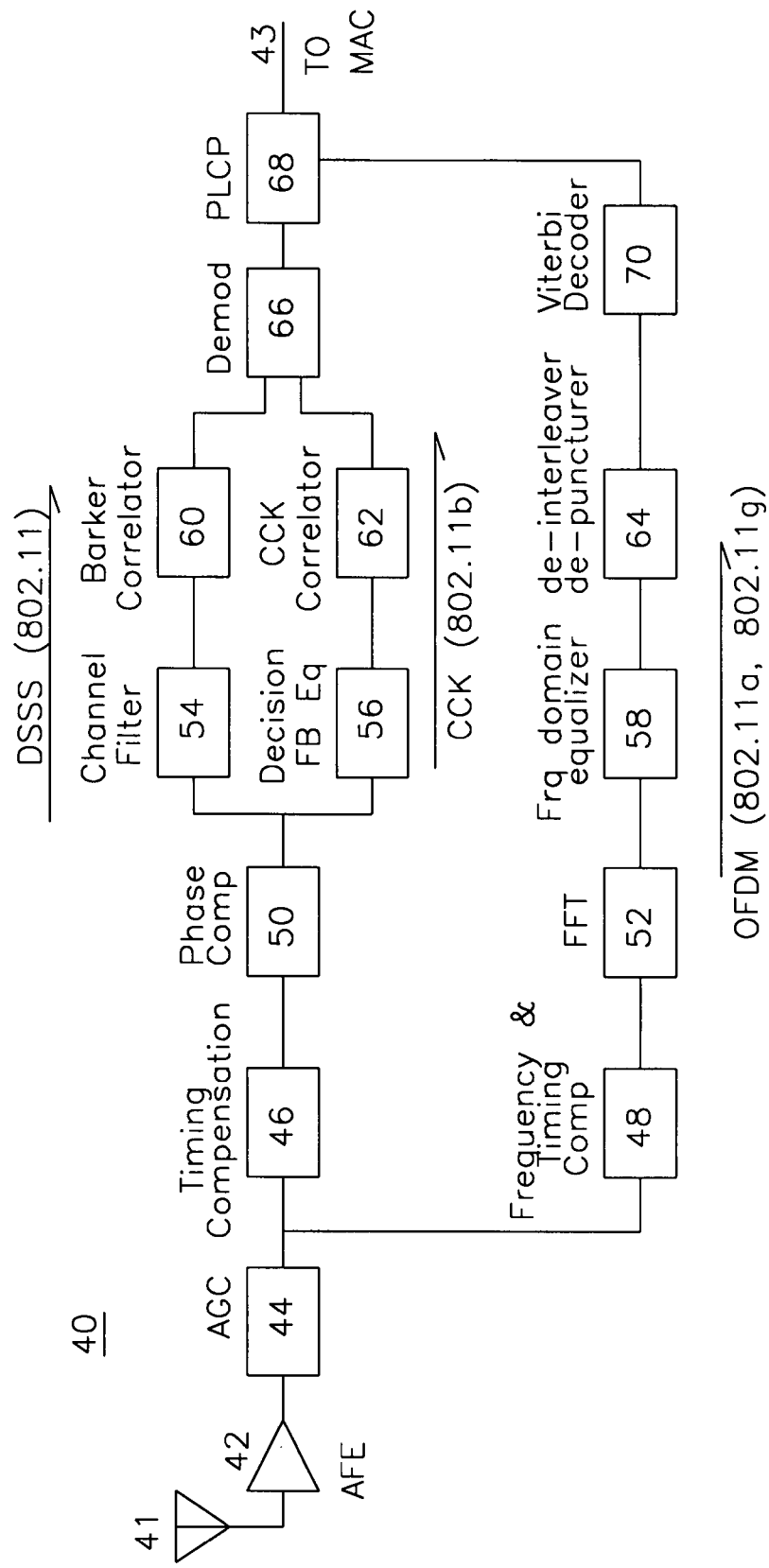

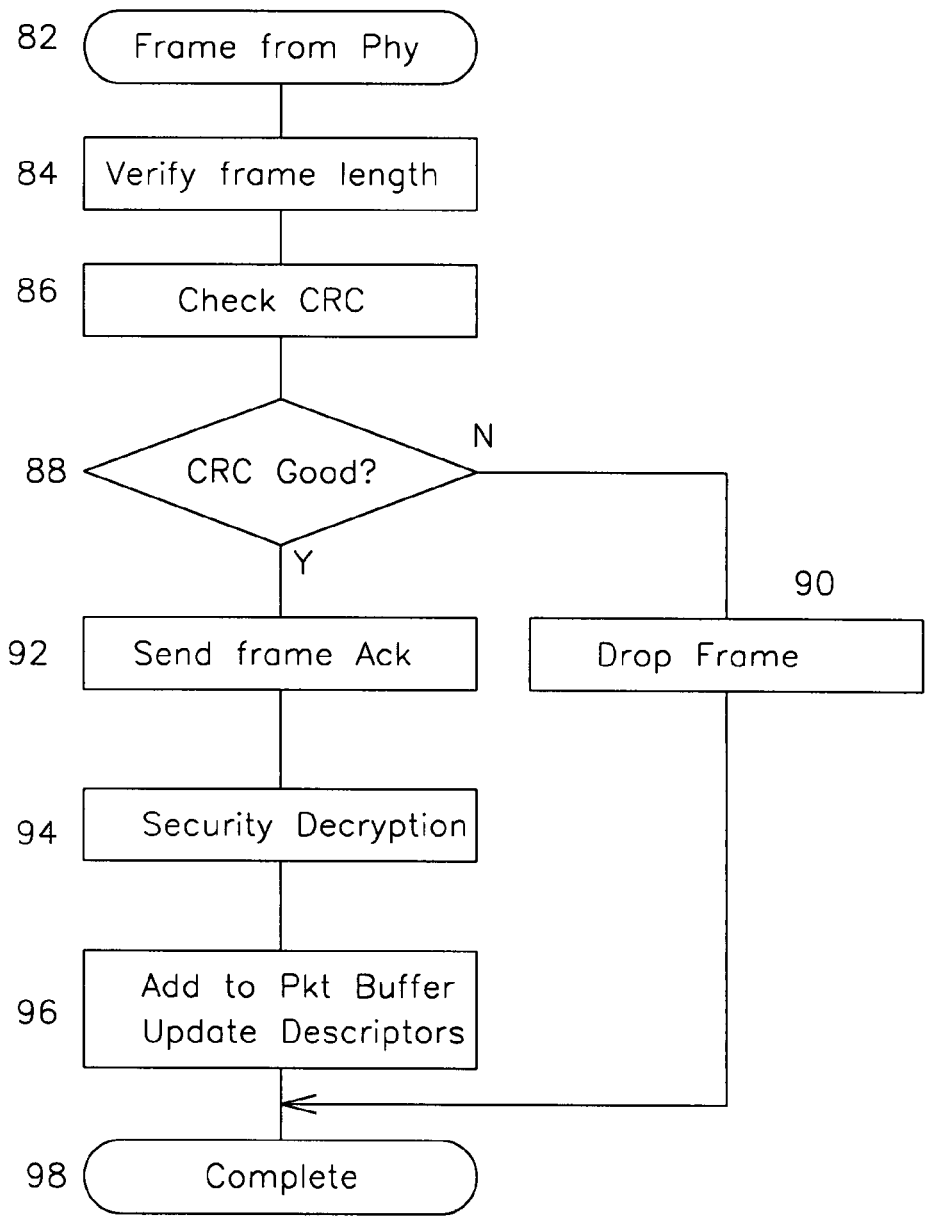

MAC Transmit Flow

100

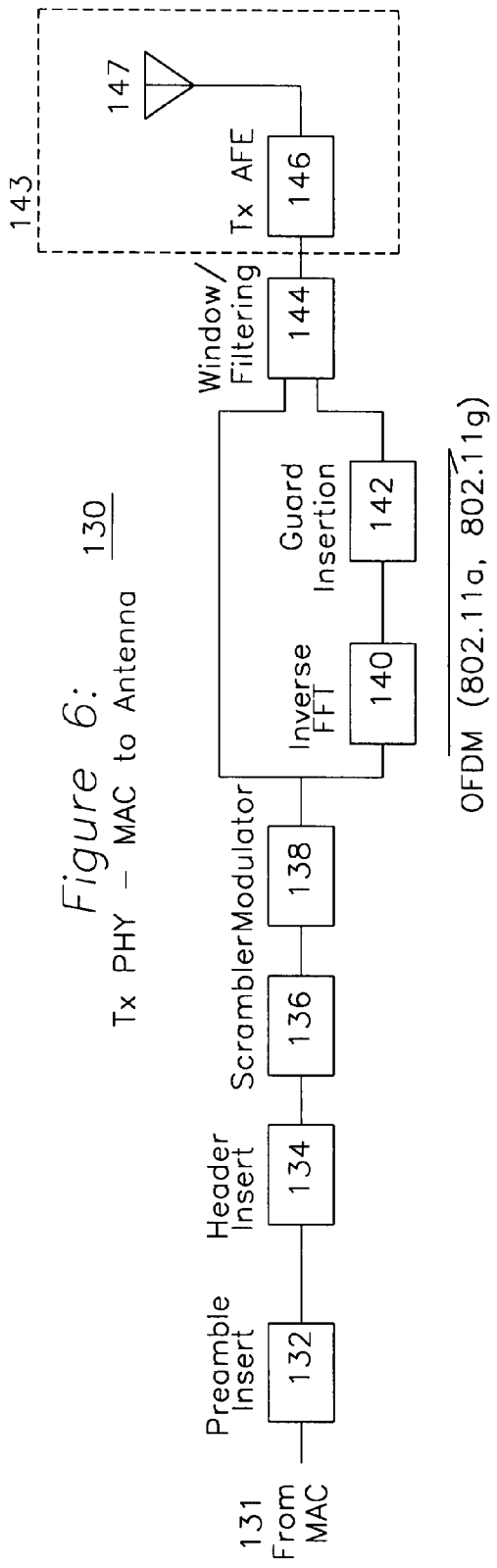
Figure 6: 130
Tx PHY – MAC to Antenna
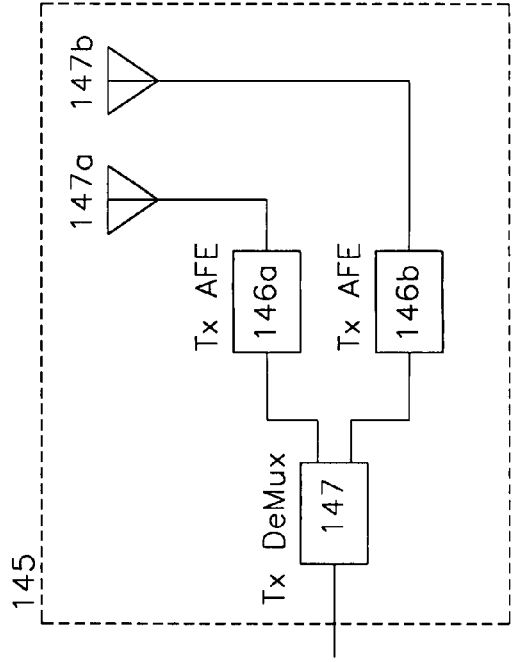
Figure 6a:

Rx PHY – Antenna to MAC

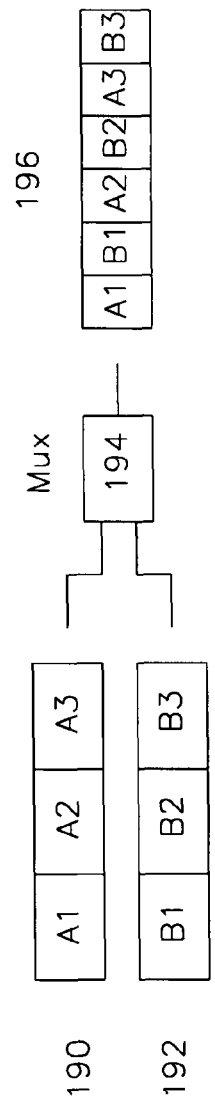
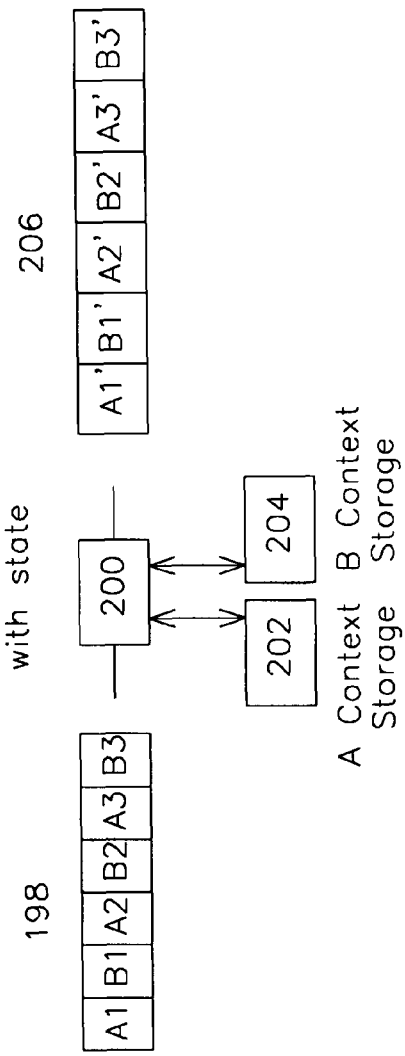

MAC Processor
Prior Art

MAC Processor

MULTI-THREAD MEDIA ACCESS CONTROLLER WITH PER-THREAD MAC ADDRESS

The present patent application is a continuation application of U.S. patent Ser. No. 10/448,639 May 30, 2003, now U.S. Pat. No. 7,327,700 now issued.

FIELD OF THE INVENTION

The invention relates to the physical layer signal processing and media access controller signal processing for a wireless communications system, such as that defined in IEEE 802.11 and related wireless protocols.

BACKGROUND OF THE INVENTION

Prior art wireless communication systems are defined in IEEE protocols 802.11 and its various derivatives 802.11a, 802.11b, and 802.11n. In a typical wireless communications system, an RF signal is heterodyned to an intermediate frequency and signal processing occurs to generate a stream of data forming a frame, and a device which performs this processing is known as the physical layer device (PHY) in the OSI layer definitions. The PHY acts as an interface between the RF signal and the stream of unframed data moving to the media access controller (MAC). The media access controller (MAC) layer receives unframed data and separates header information and CRC information to perform data integrity checking, producing a data stream to a host interface, where such data may be moved via a FIFO interface, or into a packet buffer whereby data is held in structures which contain pointers to the next data structure, as is typical for PCI host adapters. In a prior art system, the signal processing from an antenna to the packet memory may be called a wireless host adapter, and each processing stage of the host adapter requires specialized circuitry for the performance of each specific function. If it is desired to allow multiple simultaneous wireless sessions, which requires the user have more than one wireless host adapter, then each host adapter contains its own circuitry, which performs the required PHY and MAC functions independently from any other host adapter. Each host adapter carries one wireless session, and consumes a particular amount of space and power, and each additional host adapter linearly increases the requirement for space and power. Additionally, there are several different protocols for wireless LANs, and other protocols are under development. Presently, each protocol may require its own host adapter which operates for that particular protocol only.

It is desired to be have a wireless host adapter which is capable of receiving and transmitting signals from a plurality of wireless hosts, and includes the capability to handle a plurality of parallel signal streams in a single signal processor, including the capability to perform signal processing as if there were a plurality of concurrent signal processors, while using only one signal processor which is shared across all simultaneous communications sessions.

OBJECTS OF THE INVENTION

A first object of the invention is a multiplexed host adapter for converting a plurality of wireless sessions or channels to a single host interface.

A second object of the invention is the processing of multiple wireless connections with a single signal processor producing a single stream of multiplexed PHY data.

A third object of the invention is the handling of multiplexed PHY data with a single media access controller.

A fourth object of the invention is the realization of a media access controller operating in software that performs the functions of an IEEE 802.11 MAC with a processor and a multiple instances of a single MAC program.

SUMMARY OF THE INVENTION

A communication system receiver for handling multiple simultaneous wireless sessions comprises a plurality of analog receivers, each analog receiver having an antenna, an analog front end for converting to an intermediate frequency (IF) and producing a digital output, a multiplexer receiving digital signals from the plurality of analog receivers and producing a single multiplexed output, a multiplexed PHY for converting the single multiplexed output into a MAC format, the multiplexed PHY comprising a plurality of individual processing elements with state and context storage, and a media access controller for converting the output of the multiplexed PHY into packet data which is segregated according to session and placed into a packet buffer, one buffer for each wireless session.

FIG. 1 shows a prior art wireless communications system 10. A PHY 14 includes a receiver function with an antenna 12 for receiving and transmitting wireless signals coupled to a media access controller (MAC) 16 for detecting receive errors, requesting retransmission of missing frames, and handling transmission of data to and from a packet buffer 18. In certain cases, it is desirable to have multiple concurrent wireless sessions. FIG. 2 shows the prior art manner of handling this case. First and second antennas 24 and 22, respectively, are coupled to first and second PHY 26 and 30, which are each coupled to a first and second MAC 28 and 32 respectively, which write data directly into a packet buffer 34. Often the packet buffer 34 is a shared memory resource with processor memory, and other functions which are accessed using a general purpose bus such as PCI. In the prior art FIG. 2, the packet buffer 34 has sufficient bandwidth to handle the data traffic associated with the simultaneous read and write demand placed by each MAC 28 and 32.

BRIEF DESCRIPTION OF THE DRAWINGS

FIG. 1 shows the block diagram for a prior art PHY, MAC, and Packet Buffer for a single wireless session.

FIG. 2 shows the block diagram for a prior art PHY, MAC, and shared packet buffer for multiple simultaneous wireless sessions.

FIG. 3 shows the receive signal processing block diagram for a single channel multi-protocol PHY.

FIG. 4 shows the receive flowchart for a MAC controller.

FIG. 6 shows the transmit signal processing block diagram for a single channel PHY.

FIG. 6a shows an analog transmitter block diagram for a multiplexed transmit PHY.

FIG. 8 shows the operation of a multiplexer.

FIG. 9 shows the operation of a processing element with state and context storage.

DETAILED DESCRIPTION OF THE INVENTION

Figure 5:
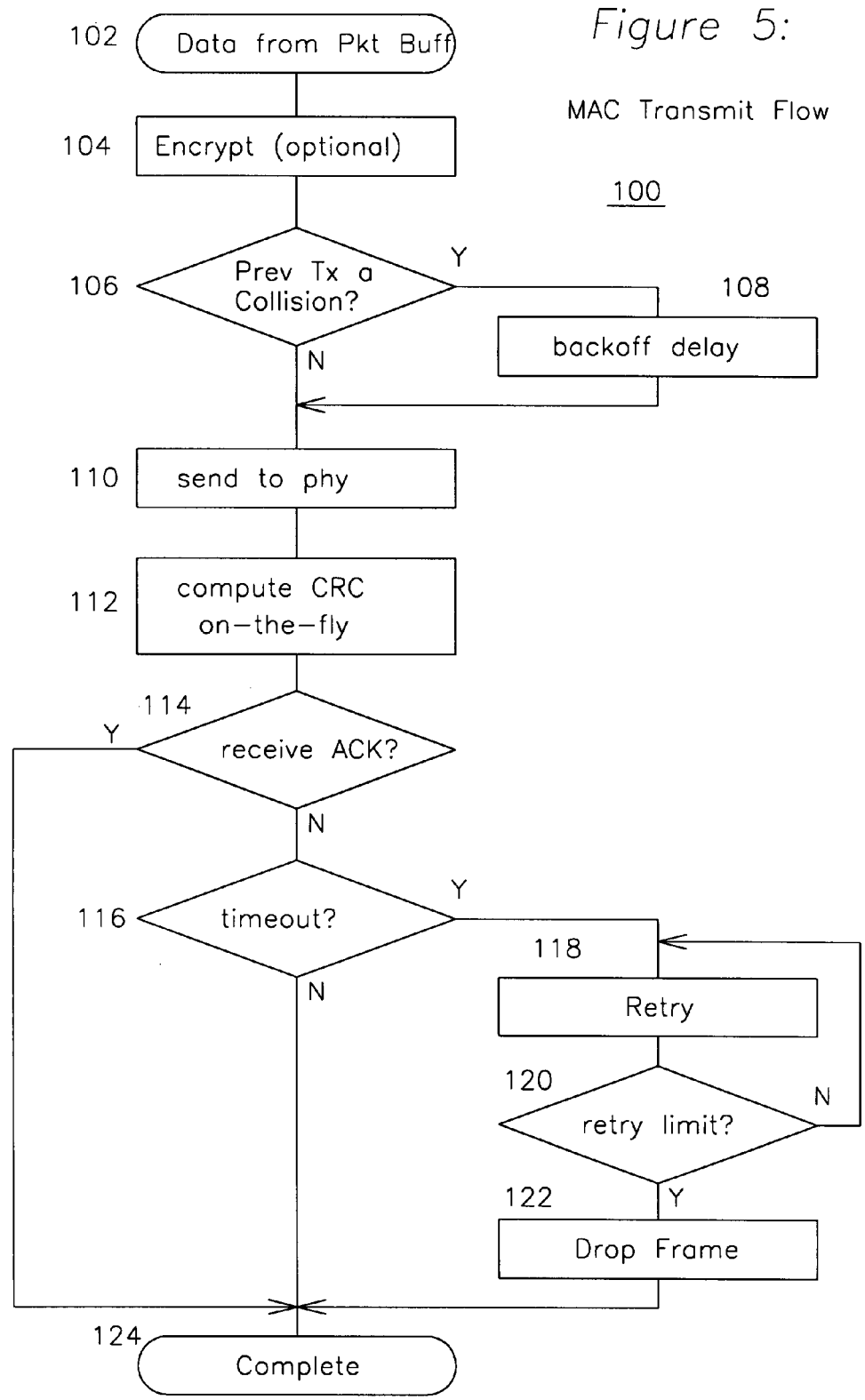
FIG. 5 shows the transmit flowchart for a MAC controller.

FIG. 3 shows the RX PHY 40 from Antenna 41 to MAC interface 43. The RX PHY 40 supports the operation of multiple IEEE wireless Ethernet formats, including 1802.11a, 802.11b, and 802.11g formats. A signal is received in the 2.4 Ghz band for 802.11b and 802.11g and in the 5 Ghz band for 802.11a by antenna 41, which passes it to the analog front end 42, which comprises a variable RF gain element, an IF stage, and an A/D stage, and produces quadrature (I and Q) sampled 6 to 10 bit data. All of the subsequent data processing blocks of FIG. 3 are operating on digitized quadrature data except the PLCP 68, which produces data for framing by the subsequent MAC processor. AGC block 44 senses overflow on the incoming digitized signals and controls the variable gain amplifiers residing in the AFE 42, thereby ensuring that the digitized signal is centered in the dynamic range of the digital processing system, and is neither truncated from excessive amplifier gain, nor too weak for effective digital signal processing. For PHY processing of an 802.11 or 802.11b signal, the timing compensation function 46 and phase compensation function 50 is used. The timing compensation block 46 handles symbol timing errors by interpolating sample values with an offset identified through a timing error detector. Small variations in timing drift between the distant transmitter and the local clock are accommodated in timing compensation block 46. The phase compensation block 50 receives the quadrature data and rotates the phase of the data using a numerically controlled oscillator (NCO). Frequency and phase errors are determined by examining the phase of each correlated and despread symbol.

For 802.11 signals at 1 Mbps or 2 Mbps, the DSSS (direct sequence spread spectrum) path of channel matched filter 54 and barker correlator 60 is used. The channel matched filter (CMF) 54 compensates for irregularities in the communications channel such as fading and multi-path effects. The channel matched filter 54 is a finite impulse response (FIR) filter that has been trained through the observation of correlation peaks and adapts the filter coefficients in order to minimize these effects. The CMF 54 also performs the role of a low pass filter matching the characteristics of the filter at the transmitter. The signal at the output of the CMF is an enhanced version of the signal at its input. The Barker correlator 60 removes the spreading code and retrieves the estimates of the transmitted data symbols. The correlator contains storage to hold a replica of the Barker code and accumulators which sum up the correlation values of all the chips in the code. The Barker correlator 60 stores intermediate values at a width of 16 bits. The Demodulator 66 uses a table look-up to assign most likely transmitted bits for each pair or in-phase and quadrature-phase signals, and produces a serial output stream to the physical layer conversion protocol block 68.

For 802.11b high rate (11 Mbps) signals, the DSSS path described above is replaced with the CCK (Complementary Code Keying) path of Decision feedback equalizer 56 and CCK Correlator 62. The Decision feedback equalizer (DFE) 56 optimizes the signals received in the CCK mode of operation. It mitigates multi-path effects using an FIR filter with 3 taps in the feedforward section and 16 taps in the feedback section. It operates over 8 bits of the incoming data at 11 Mhz. The CCK Correlator 62 uses the fast Walsh transform to reduce the number of operations required to determine which of the possible complementary codes was the most likely one. The fast Walsh transform is followed by a biggest picker circuit to determine which code to select, and intermediate values are stored in a 16 bit format. The output is sent to the demodulator 66 for this mode.

For 802.11a OFDM (orthogonal frequency division multiplexing) format, the quadrature digital signals leave the AGC block 44 and are presented to the frequency and timing compensation block 48 which uses the short preamble to determine and carry out coarse frequency and timing correction, the long preamble for fine correction and the pilot tones during the payload to carry out tracking adjustments. Inputs and outputs are 10 bit words. This is followed by an FFT 52, which computes the frequency domain version of the incoming data. A full frame of FFT data comprises 64 samples over 4 us, and it carries an identical amount of storage for its output. Frequency domain equalizer 58 is fed with coefficients computed during the preamble of every frame. Equalization in the frequency domain compensates for frequency-selective channel effects, fading, and also some errors in timing. The frequency domain equalizer 58 is a multiplier at every point of the FFT output. In the far-end transmitter PHY, interleaving is performed to reduce the effect of burst errors, and the de-interleaver and de-puncturer 64 perform the inverse function at the receive PHY 40. The de-interleaver 64 stores data worth a single OFDM symbol of 4 us duration. The Viterbi decoder 70 is a standard method of decoding convolutionally encoded signals. The decoder here has a depth of 35 stages and employs storage to keep incoming data for that period.

For the various PHY functions described above, the Physical Layer Conversion Protocol (PLCP) defines the common functions provided at the PHY interface, which includes descrambling, header CRC check, decoding header fields, and the interface to the MAC. This function is performed by PLCP block 68. Data is passed to the MAC layer on interface 43, which may be in serial or parallel format.

FIG. 4 shows the media access controller MAC receive flow 80. Receive data which leaves the PLCP 68 of FIG. 3 includes a preamble, header, data, and a CRC, as defined in the IEEE specifications for 802.11. The PHY interface 43 signals availability of data and the frame is received from the PHY into the MAC in step 82. The frame length 84 and CRC 86 are checked against the received data, and if the computed CRC does not match the CRC accompanying the data, the frame is dropped in step 90. If the CRC is correct, an acknowledgement is sent to the transmitter PHY in step 92. If the protocol is secured, the packet payload is decrypted in step 94, and is passed along without modification if the protocol is non-secure. The payload is added to the packet buffer in step 96, and if the packet buffer is arranged according to data descriptors, as is typical for shared memory systems, these descriptors are updated in step 96, and MAC receive processing is completed in step 98.

FIG. 5 shows the flowchart 100 for transmission of data from the packet buffer through the MAC and to the PHY. Processing starts in step 102 whereby the MAC is notified that a packet is waiting in the packet buffer for transmission. This notification may occur using a doorbell register, an interrupt, or any method known in the art. For a secure protocol, encryption occurs in step 104, otherwise this step is bypassed. The MAC transmits the frame after a variable delay following a fixed wait period at the end of the previous packet transmission, and this timer is called a backoff timer, and results in a random length delay from the end of one transmit packet to the start of the next. This handles the case where there are multiple transmitters, and at least two of them are attempting to transmit data at the same time. Upon expiration of the backoff timer 108, transmission of the data to the PHY occurs in step 110. The CRC is computed as the data is transmitted in step 112, and the transmitter verifies that the data is acknowledged by the receiver in step 114 before completion 124. If the previously transmitted data has not been acknowledged, and the acknowledge timer expires, a transmission retry occurs in step 118 until the retry limit is reached in step 120. If this occurs, the frame is dropped in step 122 and the process is complete 124.

FIG. 6 shows the signal processing block diagram from the MAC interface 131 to the antenna 147. The transmit data is sent from the MAC over interface 131, and a preamble corresponding to the particular mode of transmission is inserted in step 132, the mode-dependant header is inserted in step 134, the mode-dependant data scrambling occurs in step 136, and mode dependant modulation occurs in block 138. Each processing block operates according to the particular mode as specified in the relevant IEEE standard. For OFDM mode, an inverse FFT block 140 converts the frequency domain represented OFDM symbols into a equivalent time domain streams, and operates on 64 symbols of data gathered over 4 us. The guard insertion block 142 is also used in OFDM mode, and adds the cyclical prefix. The window and filtering block 144 generates quadrature data, and also operates in a mode-dependant manner, as specified in the IEEE standards. For the single wireless session case where there is only one state and context for the blocks of FIG. 6, the analog transmitter 143 comprises the TX AFE 146 which consists of an up-converter to 2.4 Ghz and a power amplifier to drive the antenna 147.

Figure 7:
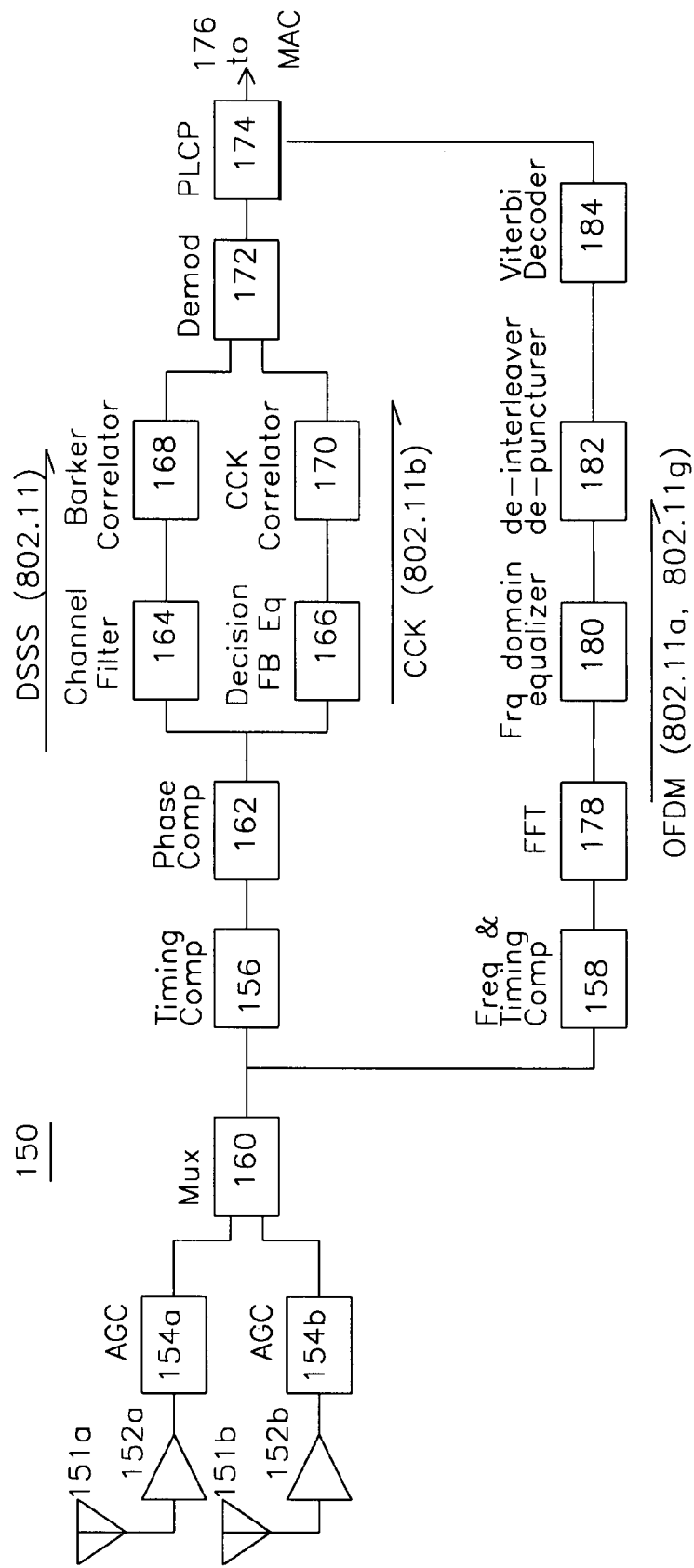
FIG. 7 shows the receive signal processing block diagram for a plurality of receivers, a multiplexer, and a multiplexed PHY.

FIG. 7 shows a multiplexed Rx PHY of the present invention. The prior art architecture for making a wireless communication device which supported a plurality of wireless connections was shown in prior art FIG. 2 for the case where there are two simultaneous wireless sessions supported. FIG. 7 shows a receive PHY which supports this two session capability while using the same digital circuitry to support a plurality of sessions, each over its own channel. An analog receiver comprises antennas 151a and 151b which receive wireless signals in one of the many IEEE 802.11 protocols, and pass them on to analog front end blocks 152a and 152b, and AGC blocks 154a and 154b, where they are converted to digital signals and resampled into an elasticity buffer. After the analog receiver generates digital sampled output, the digital outputs of the analog receiver are multiplexed into a single stream by multiplexer 160. This single stream of multiplexed data is furnished to a multiplexed PHY, which comprises all of the elements from the output of MUX 160 to the MAC output 176. After the multiplexer 160, digital signals are passed to the timing compensation block 156, which perform the same functions for multiplexed data as the non-multiplexed blocks of FIG. 3.

The operation of the multiplexer 160 may be understood by examining multiplexer 194 of FIG. 8, whereby a stream of A channel data 190 comprising A1, A2, A3 is accompanied by B channel data 192 B1, B2, B3. The stream of data represents data from each wireless session presented in sequence. For two channels, this data stream sequence is ABABAB . . . and the repeating canonical sequence for n=2 is AB. For n=3, the canonical sequence is ABC which forms the data stream ABCABCABC . . . . Returning to the n=2 case, the output of multiplexer 194 is double data rate interleaved data 196 in the format A1, B1, A2, B2, etc. FIG. 9 shows an arbitrary processing element 200, which takes as input a multiplexed stream of data 198 A1, B1, A2, B2, etc. Processing element 200 will be in one of two forms—a processing element with previous state and context storage, or a simple processing element, which has no state history. An example of an element with previous state and context storage is an FIR (finite impulse response) or IIR (infinite impulse response) filter, where a 3 stage processor requires keeping 3 previous values for each of A and B, and applies them exclusively to A or B, producing an output result, adding a new data value to context storage, and discarding an old data value from context storage with each new incoming cycle. Each stream of data would have its own associated context storage for A 202 and B 204. A 3 stage FIR filter would keep the previous 3 values for A stored in A context storage 202 and the previous 3 values for B stored in the B context storage 204, and the processing element 200 would alternate context and perform the required computation for each successive data in the data stream 198, producing the separately processed streams of data as shown in 206. The second form of processing element 200 is a simple processing element, such as a gain element where each channel stream value is multiplied by a channel-dependant constant which is taken from context storage 202 and 204. The context storage is limited to the amount of storage required to preserve the previous state, and generally corresponds to the same amount of storage for each data stream as was required by the associated native processing element found in FIG. 3 for a single stream of data.

Returning to FIG. 7, each of the elements after the multiplexer 160 comprise the multiplexed PHY and are processing elements with state and context storage, as shown in FIG. 9, and operate successively on independent channel data A and B, as was described earlier. These processing elements with state and context storage for DSSS are the same as those described in FIG. 3 for DSSS processing, and comprise the Phase Comparator 162, channel filter 164, Barker correlator 168 followed by the demodulator 172, and PLOP 174, corresponding to FIG. 3 elements 50, 54, 60, 56, 66, 68. For CCK processing, the processing elements 166 and 170 are processing elements with state and context storage corresponding to elements 56 and 62 respectively. The OFDM processor elements operate on the alternating data from the multiplexer 160 which feeds the frequency and timing compensator 158. The multiplexed processing elements with state and context storage 178, 180, 182, and 184 correspond to non-multiplexed processing elements 48, 52, 58, 64, 70 of FIG. 3. The PLCP 174 adapts the data to the MAC layer interface, and is also multiplexed and alternating between A and B, as are the other processing elements.

Figure 10:
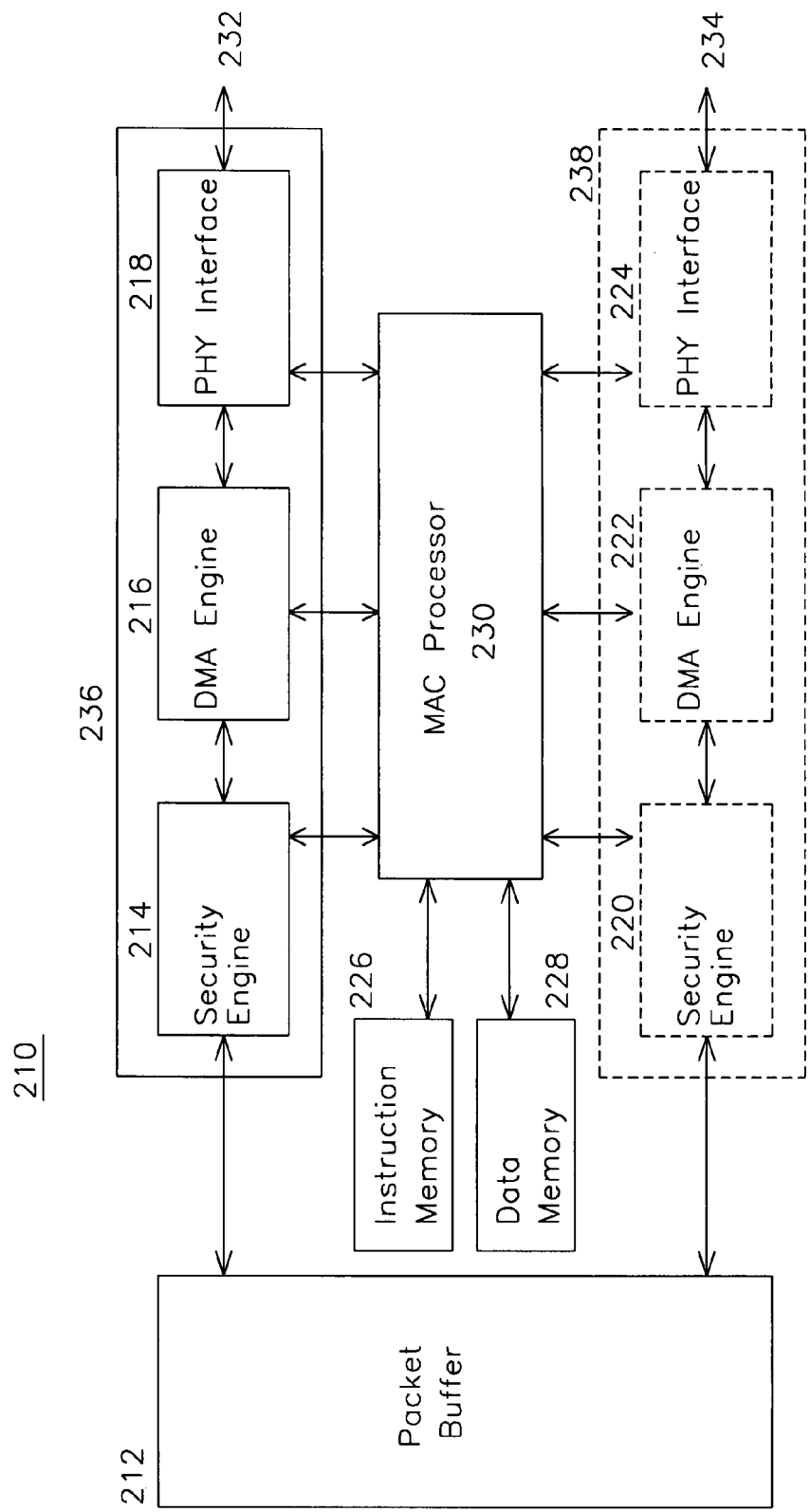
FIG. 10 shows a prior art MAC processor.

FIG. 10 shows a prior art MAC processor capable of handling two streams of data from a PHY. This corresponds to the architecture of prior art FIG. 2, where the MAC functions are performed in separate engines in separate streams, but by a common processor 230. Data for the A channel arrives on PHY interface 232 to PHY interface processor 218, which signals to the MAC processor 230 that frames are available on this interface. The processing steps of FIG. 4 are handled by the MAC processor 230 according to instructions held in instruction memory 226 as data moves through the DMA engine 216, the optional security engine 214, and to the packet buffer 212. Similarly, data for the B channel may move through the analogous B channel interfaces 234, 224, 222, 220, and to the shared packet buffer 212. The MAC processor 230 executes from instruction memory 226, and keeps local data for instruction processing in data memory 228.

Figure 11:
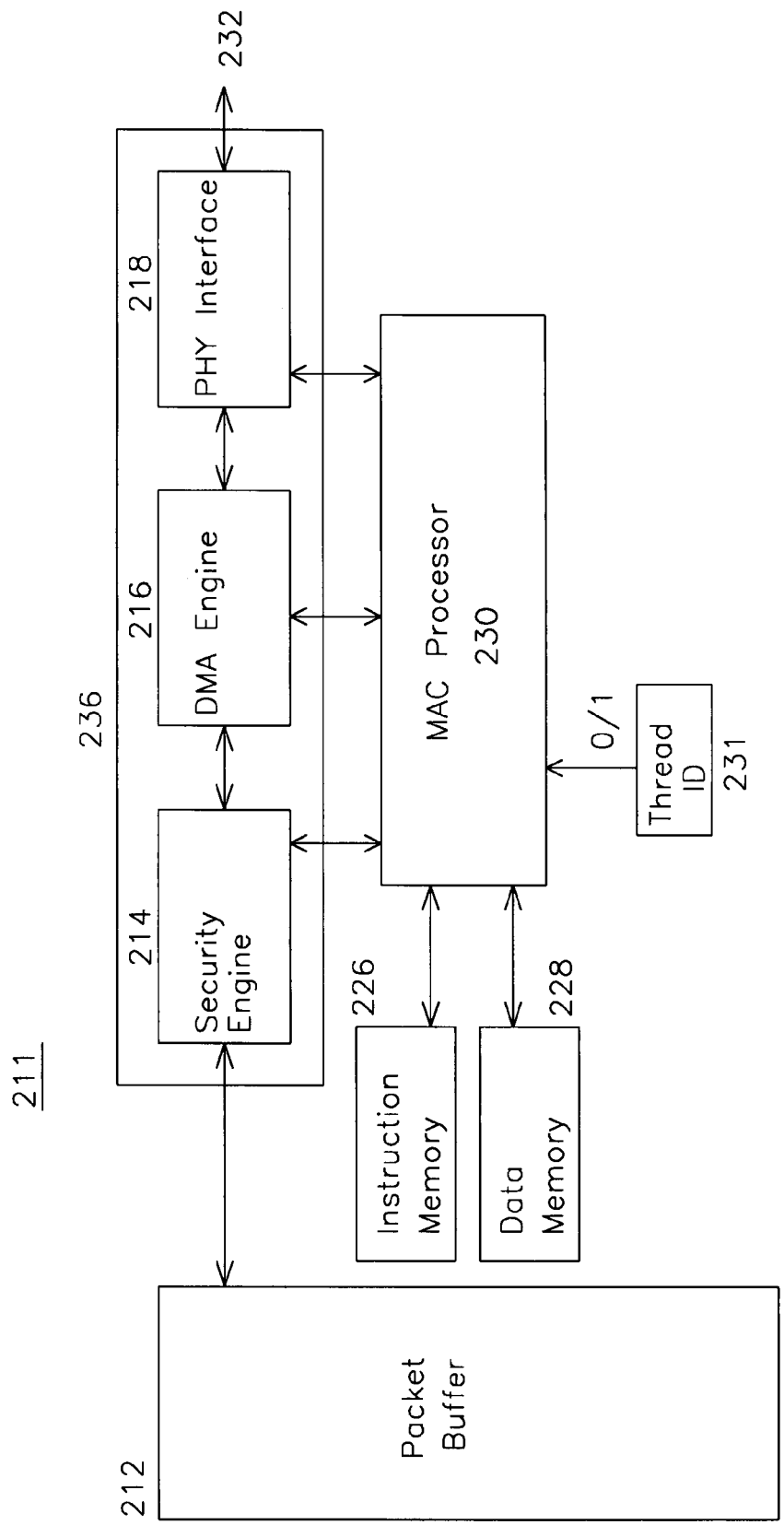
FIG. 11 shows a multiple session MAC processor for handling a plurality of wireless sessions.

FIG. 11 shows the MAC processor of the present invention. The prior art FIG. 10 showed the MAC processor with separate MAC processing engines 236 and 238 for the A and B channels, for interfacing to non-multiplexed PHYs, as shown in FIG. 2. The present invention MAC FIG. 11 shows a single MAC processor 236 for handling a multiplexed stream of PHY data on interface 232. Incoming data from the A channel causes a response from the 0 thread, and incoming data from the B channel causes a response from the 1 thread, where the 0 thread and 1 thread are different instances of the same MAC processor program which have their own context and state, each thread keeping track of the associated data stream for the associated A or B channel. The PHY interface 218 operates as before, accepting alternating data from channels A and B, multiplexed as was shown in FIG. 9. The MAC processor 230 is a multithreaded processor, capable of running more than one instance of a single MAC program. Each thread is able to determine its identity through a Thread ID function 231, which returns 0 or 1 depending on which thread is reading the thread ID function. While a typical use of the MAC processor is multiple instances of different programs, the MAC processor 230 runs multiple instances of the same program which was described in FIGS. 4 and 5. The multiplexed data arriving at PHY interface 218 is therefore handled by a two threads, one of which is handling the A data, and one of which is handling the B data. This segregation of incoming data by process thread may be handled by having the A data invoke an interrupt associated with the 0 thread and the B data invoke an interrupt associated with the 1 thread. In this manner, effectively two MAC processors are operating on data arriving on the PHY interface 218, and placing the data into the packet buffer 212. The MAC processors initialize with pointers to different areas of the packet buffer to avoid overwriting each other, but otherwise operate independently.

With regard to the packet buffer to antenna transmitter for the multiplexed case of n simultaneous wireless sessions, the transmit process 100 begins when a completed packet is placed in the transmit packet buffer 212, in a transmit queue associated with either thread 0 (for transmission on channel A), or thread 1 (for transmission on channel B) for the case where n=2. As before, the transmit MAC 211 comprises two instances (threads) of the identical transmit process 100, where each thread is distinguishable from the other, and each is separately responsible for each separate transmit queue for A channel and B channel which is shared within the transmit buffer. Each separate thread 0 and thread 1 uses the common MAC interface 232 for the transmission of data in alternating ABAB format 196, as was illustrated for the receive case in FIG. 8. In the present example of the MAC transmit interface 232, data of the format shown in 196 is presented to the multiplexed transmit PHY 130 of FIG. 6. Each block of the transmit PHY 130 operates as was described for FIG. 6, however each block preamble insert 132, header insert 134, scrambler 136, modulator 138, inverse FFT 140, guard insert 142, and window/filtering block 144 is formed from a processing element with state and context storage shown in FIG. 9. Each of the recited blocks performs the required function, however it alternates between the A context and B context, as was explained for the receive PHY of FIG. 7. Earlier, FIG. 6 described the analog transmitter 143 for the single wireless session case, where none of the blocks of FIG. 6 had multiple context and state information, and only preserved a single context and state. In the multiplexed embodiment of the transmitter, analog transmitter 143 is replaced by analog multiplex transmitter 145, which comprises a demultiplexer 147, which performs the opposite operation shown in FIG. 8, and takes a multiplexed stream 196 and produces two segregated streams 190 and 192. The segregated streams are each applied to an analog front end 146*a* and 146*b* which handle a single context, and these upconvert to the RF frequency, perform power amplification to the region of 0 dbm, and each amplifier 146*a*, 146*b*, etc is coupled to a transmit antenna 147*a* and 147*b*, as is known in the prior art. The block diagram of FIG. 6 shows a single context, or a multiple context multiplexed transmit PHY. While the case of one and two wireless transmit sessions has been described, this is for example only, and it is clear to one skilled in the art that this may be extended to n simultaneous wireless sessions.

The receiver or transmitter PHY and MAC of the invention may be expanded to an arbitrary number n of communications channels, and two channels are shown as an example only. For example, FIG. 7 could be expanded to show 3 or 4 or more receive antennas 151, AFE 152, AGC 154, and timing compensators 156, and the single arrangement of processing elements with state of FIG. 7, and a single MAC processor with a matching number of instances of the MAC processor program running. In this way, the invention may be expanded to any number of processing channels.

In addition to the multiplexed mode of operation, where wireless sessions of data are multiplexed over a canonical sequential stream, as was shown in FIG. 8, where the transmitter and receiver PHY and MAC are processing unrelated data streams, there processing herein may be performed in other ways which enhance the error performance of the device. Each of the multiplexed processing elements shown in FIG. 7 require a data resolution, which translates into a context storage word size. For example, the fast Fourier transform (FFT) element 178 requires the storage of a previous number of data points, such as 64 points. The storage requirement for two such sessions of multiplexed data is then 128 points of data. In the non-multiplexed mode of operation, it is not necessary to leave 64 of the 128 data points of storage unused. The performance of the FFT improves with greater numbers of data points, so it is possible to have a multiplexed mode of operation, where the FFT is computed on 64 points, and a non-multiplexed mode of operation, where the FFT is computed on 128 points, using the unused storage from the 64 points on the otherwise unused channel. In this manner, each of the processing elements of FIG. 7 receiver and FIG. 6 transmitter may have a multiplexed mode, and a non-multiplexed mode where the word sizes or number of data points is doubled in the non-multiplexed mode compared to the multiplexed mode.

In the multiplexed mode of operation, it is possible to use the data streams as redundant channel pairs. In this case, it is possible to transmit or receive the same data on at least 2 of the wireless sessions, or for the case of n=2, to have two redundant data streams represented in the two sessions. When this is done, the receive processing of each data stream is done as before up to the demodulator. In the demodulator, there are two different approaches that can be taken.

In the first demodulation approach, the demodulator 172 is examining the successive data streams, and the demodulation decision includes the transient selection of the data stream with the lowest symbol error, by using any of the metrics available during symbol selection in the demodulation step 172. In this manner, the redundant streams of data may be selected in a permanent, or transient manner, such that the overall error rate is reduced through the system by selecting only the highest performance channel in the multiplexed data stream carrying redundant streams of data on simultaneous wireless sessions.

In the second demodulation approach, the data streams are delay compensated such that they represent the same data stream from different sessions, having experienced different transmit paths. The two data streams are summed, which has the effect of improving the signal to noise ratio, prior to the demodulator acting on the single stream of data. In this manner, the overall SNR is improved through use of the second channel.

The two demodulation approaches described above have advantages and disadvantages. The first approach of stream selection during decoding may be advantageous when one path experiences a sudden degradation in performance for an interval of time, while the second approach of summing may produce improved SNR when the transmit paths experience slowly varying degradations that the channel processing elements are able to track.

For redundant transmission, the transmitter MAC of FIG. 5 may draw data from the same packet buffer source in step 102, thereby transmitting redundant streams of data through the transmit MAC of FIG. 5 and Transmit PHY of FIG. 6. For this redundant transmission, the only modification required from non-redundant transmission is the non-segregation of data sources in the transmit packet buffer 212.

We claim:

1. A process for a multithread media access controller (MAC) receiving a single stream of multiplexed receive digitized quadrature PHY data formed from the canonical sequencing of n streams of simultaneous session data, each said session data stream having packets derived from a separate wireless receiver, the packets having, in sequence, a MAC source address, a MAC destination address, a sequence number, packet data, and a CRC, each said session associated with a unique thread identifier generated by a thread ID generator, an associated session MAC address, and associated context data from a previous processing step of said packet, said process operating separately and independently for each said stream of session data, and including the steps:

receiving said multiplexed receive digitized quadrature PHY data associated with a particular MAC destination address and placing only said packet data for said unique session MAC address into a unique packet buffer associated with said session MAC address and verifying a CRC, said receiving step not placing said packet data into said packet buffer when said packet MAC destination address does not match the MAC address associated with said session;

when said verified CRC is correct, sending an acknowledgement and accepting only said packet data into said packet buffer associated with said MAC destination address;

where said multithread MAC controller is operative on only one of said n streams of simultaneous session data and said associated context data at a particular moment in time, and is operative on a different one of said n streams of simultaneous session data and said associated context data thereafter, said process operating on each one of said canonical sequences of said multiplexed digitized quadrature PHY packet data for a substantially uniform duration of time;

where said n is at least 2, and where said process uses said thread identifier to determine which said session to process.

2. The process of claim 1 where at least one of said streams of session data includes PHY data demodulated from a format compatible with IEEE 802.11a.

3. The process of claim 1 where at least one of said streams of session data includes PHY data demodulated from a format compatible with IEEE 802.11b.

4. The process of claim 1 where at least one of said streams of session data includes PHY data demodulated from a format compatible with IEEE 802.11g.

5. The process of claim 1 where said plurality of simultaneous streams of session data include at least two session streams carrying the same data, and at least one of said session streams is accompanied by a performance metric which is used to select one of said streams.

6. The process of claim 1 where said plurality of simultaneous sessions are redundant sessions carrying the same data, each said session accompanied by a signal to noise ratio, said controller selecting a particular said session based on said signal to noise ratio.

7. The process of claim 1 where the number of said sessions is 2, and said multiplexed receive PHY data alternates between data for a first session and data for a second session.

8. The process of claim 1 where said MAC process is sequentially operative on each of said n session data streams.

9. The process of claim 1 where the steps receiving said PHY data and said verifying CRC generate part of said context data which is stored for each of said n sessions.

10. The process of claim 1 where said MAC process canonically operates on each of said n session data streams.

11. The process of claim 1 where each said MAC processor separates data for each said session into a single said packet buffer, data for each said session stored in a unique region of said packet buffer.

12. The process of claim 1 where said accepting said PHY data into said packet buffer includes updating data associated with said MAC address.

13. A process for a multithread media access controller (MAC) for the removal of packet data associated with a plurality of sessions from a packet buffer for delivery to a plurality of wireless modulator output interfaces, each said wireless modulator output interface associated with a session identifier, said MAC canonically operative on each successive session, and operative on a single session at a time, said process including:

a MAC address which is specific to each said session;

a first step of delivering a header for a packet, said header including said MAC address which is specific to a particular said session, each particular said session being associated with said particular session MAC address;

a second step of reading data for said particular session from said packet buffer and forming a packet from said data, said packet including at least a MAC source address formed from said session MAC address, a MAC destination address, a sequence number, and a frame containing packet data;

a third step of computing and delivering a CRC which is appended to said packet, said CRC computed from said second step packet;

a fourth step of detecting a collision and resending said packet after a suitable backoff interval;

a fifth step of receiving an acknowledgement for a sent packet and re-sending said packet if said acknowledgement is not received;

where said first through fifth steps are operative independently for each said session by a single said MAC which determines said MAC address from said session identifier, and at least one of said first through fifth steps is operative in conjunction with session context data saved from a previous said step, and where at least one said wireless modulator output interface is responsive to one said session;

and where at least two instances of said first through said fifth process steps are operative on said single MAC by presenting said session data to said MAC in canonical form for each said session, each said instance associated with a MAC address and session context data for each said instance which is unique from the MAC address and associated session context data of other said instance, said single MAC thereby processing at least two unrelated said sessions;

where said wireless modulator output interface demultiplexes said stream of canonical session data as separate streams of quadrature data, and modulates each said stream of quadrature data to a transmission frequency for coupling to an antenna;

and where said process is operative on a particular session as determined by the value of a thread identifier generated by a thread ID generator.

14. The process of claim 13 where said packet buffer is divided into contiguous regions, one such region for each said session data.

15. The process of claim 13 where said second step is completed for a particular session before starting said second step for a different session.

16. The process of claim 13 where said second step is successively performed for a plurality of different said sessions.

17. The process of claim 13 where said first through fifth steps are a single process instance which operates successively for each separate said session.

18. The process of claim 13 where each said plurality wireless modulator output is coupled to an antenna and said wireless modulator output is according to one of the IEEE standards 802.11a, 802.11b, or 802.11g.

19. The process of claim 13 where said plurality of wireless modulator output interfaces comprises a de-multiplexer receiving said plurality of sessions organized in canonical sequence, separating each said canonical sequenced session and mixing each said separated modulated session to a wireless modulation frequency, thereafter coupling each said separated, modulated, and mixed session to an antenna.

20. The process of claim 13 where said first through fifth steps are multiple process instances, each of which process operates independently on each said session.

\* \* \* \* \*